(12) United States Patent
Strasser et al.

(10) Patent No.: US 7,599,619 B2
(45) Date of Patent: Oct. 6, 2009

(54) WAVELENGTH DIVISION MULTIPLEXED OPTICAL COMMUNICATION SYSTEM HAVING A RECONFIGURABLE OPTICAL SWITCH AND A TUNABLE BACKUP LASER TRANSMITTER

(75) Inventors: Thomas Andrew Strasser, Warren, NJ (US); Paul Bonenfant, Ocean, NJ (US); Jefferson L. Wagener, New Hope, PA (US)

(73) Assignee: Meriton Networks US Inc., Wilmington, DE (US)

( * ) Notice: Subject to any disclaimer, the term of this patent is extended or adjusted under 35 U.S.C. 154(b) by 938 days.

(21) Appl. No.: 10/099,561

(22) Filed: Mar. 15, 2002

(65) Prior Publication Data
US 2002/0145778 A1 Oct. 10, 2002

Related U.S. Application Data

(60) Provisional application No. 60/276,310, filed on Mar. 16, 2001.

(51) Int. Cl.
*H04J 14/00* (2006.01)
(52) U.S. Cl. .......................... 398/48; 398/49
(58) Field of Classification Search ...... 398/2, 398/7
See application file for complete search history.

(56) References Cited

U.S. PATENT DOCUMENTS

| | | | |
|---|---|---|---|
| 5,504,609 A | 4/1996 | Alexander et al. | 359/125 |
| 5,557,439 A | 9/1996 | Alexander et al. | 359/130 |

(Continued)

OTHER PUBLICATIONS

"Telecom Glossary 2K", ATIS, Feb. 28, 2001, item "free space".*

(Continued)

*Primary Examiner*—Shi K Li
(74) *Attorney, Agent, or Firm*—Mayer & Williams PC; Stuart H. Mayer, Esq.; Karin L. Williams, Esq.

(57) ABSTRACT

In a WDM optical communication system that includes a plurality of nodes interconnected by communication links, a node is provided that includes a reconfigurable optical switch having a plurality of input ports and at least one output port. The node also includes a plurality of transmitters that are each coupled to one of the input ports of the optical switch. Each of the transmitters generate an information-bearing optical signal at a different channel wavelength from one another. The reconfigurable optical switch is adaptable to receive at any of the input ports any of the channel wavelengths at which the plurality of transmitters operate and direct the channel wavelengths to the output port. At least one backup transmitter is coupled to one of the input ports of the optical switch. The backup transmitter includes a tunable laser tunable to any of the channel wavelengths at which the plurality of transmitters operate. The reconfigurable optical switch includes at least one wavelength selective element that selects at least one channel wavelength from among any of the channel wavelengths received at any of the input ports. The switch also includes a plurality of optical elements associated with the wavelength selective elements, Each of the optical elements direct one of the selected channel wavelengths selected by the associated wavelength selective element to the output port independently from every other channel wavelength. The selected channel wavelengths directed to the output port are combined on the output port.

16 Claims, 3 Drawing Sheets

U.S. PATENT DOCUMENTS

| | | | |
|---|---|---|---|
| 5,608,825 A | 3/1997 | Ip | 385/24 |
| 5,712,932 A | 1/1998 | Alexander et al. | 385/24 |
| 5,909,295 A | 6/1999 | Li et al. | 359/130 |
| 5,920,411 A * | 7/1999 | Duck et al. | 398/85 |
| 5,960,133 A * | 9/1999 | Tomlinson | 385/18 |
| 5,974,207 A * | 10/1999 | Aksyuk et al. | 385/24 |
| 5,995,256 A * | 11/1999 | Fee | 398/34 |
| 6,005,694 A | 12/1999 | Liu | 359/110 |
| 6,067,389 A | 5/2000 | Fatehi et al. | 385/17 |
| 6,097,859 A | 8/2000 | Solgaard et al. | 385/17 |
| 6,101,011 A | 8/2000 | Taylor | 359/124 |
| 6,151,157 A | 11/2000 | Ball et al. | 359/341 |
| 6,172,782 B1 * | 1/2001 | Kobayashi | 398/9 |
| 6,192,172 B1 | 2/2001 | Fatehi et al. | 385/17 |
| 6,192,174 B1 | 2/2001 | Lee | 385/24 |
| 6,198,857 B1 | 3/2001 | Grasis et al. | 385/24 |
| 6,389,188 B1 * | 5/2002 | Scobey et al. | 385/18 |
| 6,400,477 B1 * | 6/2002 | Wellbrook | 398/45 |
| 6,501,877 B1 * | 12/2002 | Weverka et al. | 385/31 |
| 2002/0067888 A1 | 6/2002 | Morozov et al. | 385/37 |

OTHER PUBLICATIONS

Daniel J. Blumenthal, "The $S^3$ of MEMS-based Photonic Switches: Scalability, Size and Serviceabilty," Caliente Networks, San Jose, California, Nov. 22, 2000.

Stephen B. Alexander et al., "A Procompetitive Consortium on Wide-Band All-Optical Networks," *Journal of Lightwave Technology*, vol. 11, No. 5/6, May/Jun. 1993, pp. 714-735.

U.S. Appl. No. 09/571,833, filed May 16, 2000, Wagener et al.

U.S. Appl. No. 09/691,812, filed Oct. 19, 2000, Wagener et al.

* cited by examiner

FIG. 1

FLEXIBLE MUX AND DEMUX IN WDM COMMUNICATION SYSTEM

FIG. 2

FLEXIBLE MUX AND DEMUX IN WDM COMMUNICATION SYSTEM

FIG. 3

WAVELENGTH DIVISION MULTIPLEXED OPTICAL COMMUNICATION SYSTEM HAVING A RECONFIGURABLE OPTICAL SWITCH AND A TUNABLE BACKUP LASER TRANSMITTER

STATEMENT OF RELATED APPLICATION

This application claims the benefit of priority to U.S. Provisional Patent Application No. 60/276,310, filed Mar. 16, 2001, entitled "Reconfigurable Optical System."

FIELD OF THE INVENTION

The invention relates generally to wavelength division multiplexed optical communication systems, and more particularly, to wavelength division multiplexed optical communication systems which include reconfigurable optical switches coupled to backup transmitters that incorporate tunable lasers.

BACKGROUND OF THE INVENTION

Wavelength division multiplexing (WDM) has been explored as an approach for increasing the capacity of fiber optic networks to support the rapid growth in data and voice traffic applications. A WDM system employs plural optical signal channels, each channel being assigned a particular channel wavelength. In a WDM system, signal channels are generated, multiplexed, and transmitted over a single waveguide, and demultiplexed to individually route each channel wavelength to a designated receiver. Through the use of optical amplifiers, such as doped fiber amplifiers, plural optical channels are directly amplified simultaneously, facilitating the use of WDM systems in long-distance optical systems.

Proposed wavelength division multiplexed optical communication systems typically include multiplexer and demultiplexer switching elements which permit only a fixed number of optical channels to be used in the optical system. In one optical system configuration, for instance, the multiplexed signal is broken down into its constituent optical signals through the use of an integrated frequency router demultiplexer. The frequency router uses silicon optical bench technology in which plural phosphorus-doped silica waveguides are disposed on a silicon substrate. An optical star outputs to an array of N waveguides having adjacent optical path lengths which differ by q wavelengths; this array in turn feeds an output N×N star. Such a frequency router design for an optical communication system is described in Alexander et al., J. Lightwave Tech., Vol. 11, No. 5/6, May/June 1993, p. 714. Using a 1×N configuration at the input, a multiplexed optical signal containing light of different frequencies is separated into its component frequencies at each waveguide extending from the output N×N star. Although this configuration adequately separates light of different frequencies, the integrated optical design fixes both the number and the respective wavelengths of the optical channels. Consequently, adding or decreasing the number of optical channels or changing the channel wavelength or spacing is not possible without providing a completely new demultiplexing switching element to the optical network. In other words, the scalability of such networks is limited because of the switching element's lack of flexibility.

One area where this lack of flexibility manifests itself is in connection with the provisioning of a backup path through the network in the event of equipment failure. For example, in the aforementioned WDM transmission system, since each channel wavelength is assigned its own path through the switching element, it is not possible to reroute a given channel wavelength along a different path should a failure occur in the transmitter that generates the given wavelength. In particular, it is not possible to substitute for the failed transmitter a backup transmitter that resides on another of the switching element's input ports unless the backup transmitter operates on its own channel wavelength that is different from the wavelength at which the failed transmitter operates. As a result, when it becomes necessary to use the backup transmitter a new path must be established through the entire network to accommodate the change in channel wavelength. Unfortunately, the provisioning of a backup path can be a slow process requiring inter-node communication and processing, which not only slows down the restoration process, but which may also disturb other traffic in the system.

Accordingly, it would be desirable to provide an optical communication system in which a backup path can be provisioned through the system in the event of a transmitter or receiver failure that allows restoration to be accomplished in a more rapid and less disruptive manner than in the aforementioned system.

SUMMARY OF THE INVENTION

In a WDM optical communication system that includes a plurality of nodes interconnected by communication links, the present invention provides a node that includes a reconfigurable optical switch having a plurality of input ports and at least one output port. The node also includes a plurality of transmitters that are each coupled to one of the input ports of the optical switch. Each of the transmitters generates an information-bearing optical signal at a different channel wavelength from one another. The reconfigurable optical switch is adaptable to receive at any of the input ports any of the channel wavelengths at which the plurality of transmitters operate and direct the channel wavelengths to the output port. At least one backup transmitter is coupled to one of the input ports of the optical switch. The backup transmitter includes a tunable laser tunable to any of the channel wavelengths at which the plurality of transmitters operates. The reconfigurable optical switch includes at least one wavelength selective element that selects at least one channel wavelength from among any of the channel wavelengths received at any of the input ports. The switch also includes a plurality of optical elements associated with the wavelength selective elements, Each of the optical elements direct one of the selected channel wavelengths selected by the associated wavelength selective element to the output port independently from every other channel wavelength. The selected channel wavelengths directed to the output port are combined on the output port.

In accordance with one aspect of the invention, the wavelength selective element includes a plurality of thin film filters each transmitting therethrough a different one of the channel wavelengths and reflecting the remaining channel wavelengths.

In accordance with another aspect of the invention, the optical elements are reflective mirrors that are selectively tiltable in a plurality of positions such that in each of the positions the mirrors reflect the channel wavelength incident thereon to the output port.

In accordance with yet another aspect of the invention, the wavelength selective elements may be bulk diffraction gratings.

In accordance with yet another aspect of the invention, a free space region is located between the input ports and the wavelength selective elements.

In accordance with another aspect of the invention, a node, which is situated in a WDM optical communication system that includes a plurality of nodes interconnected by communication links, includes a reconfigurable optical switch. The reconfigurable optical switch has (i) N input ports for receiving a WDM optical signal having up to (N−1) channel wavelengths (ii) at least one output port, where N is greater than or equal to 2 and (iii) a switching fabric that includes at least (N−1) optical elements each directing a selected one of the channel wavelengths between the input ports and the output port. The node also includes N transmitters respectively coupled to the N input ports of the optical switch. The transmitters each include a tunable laser tunable to any of the (N−1) channel wavelengths. The reconfigurable optical switch is adaptable to receive at any of the input ports any of the channel wavelengths at which the plurality of transmitters operate and direct each of the channel wavelengths to the output port by reconfiguration of the optical element respectively directing the channel wavelength. A similar reconfigurable switch arrangement is present at the receiving end of the optical signal to direct the received signal to the backup transponder.

DETAILED DESCRIPTION

In accordance with the present invention, a WDM optical transmission system is provided which employs reconfigurable switching elements that can dynamically change the path along which a given wavelength is routed. By employing such switching elements, the present invention provides a restoration arrangement for a failed transmitter that is more responsive and less disruptive to other traffic than the conventional arrangement that employs a backup transmitter operating at a different channel wavelength from that of the failed transmitter.

Recently, switching elements that provide a degree of reconfigurability have become available. These reconfigurable optical elements can dynamically change the path along which a given wavelength is routed to effectively reconstruct the topology of the network as necessary to accommodate a change in demand or to restore services around a network failure. Examples of reconfigurable optical elements include optical Add/Drop Multiplexers (OADM) and Optical Cross-Connects (OXC). OADMs are used to separate or drop one or more wavelength components from a WDM signal, which is then directed onto a different path. In some cases the dropped wavelengths are directed onto a common fiber path and in other cases each dropped wavelength is directed onto its own fiber path. OXCs are more flexible devices than OADMs, which can redistribute in virtually any arrangement the components of multiple WDM input signals onto any number of output paths. Unfortunately, current OXC's generally employ a digital cross-connect at their cores, thus requiring optical-to-electrical interfaces into and out of the cross-connect. Such an arrangement gives rise to a number of limitations, including a relatively high insertion loss because the optical signals must pass through three discrete components. In addition, the components are relatively expensive while still not providing a completely flexible switch that can transfer light between any two subsets of the ports. Finally, because of their high loss as well as the need to provide channels with equal power, such OXC's typically employ optoelectronic regenerators on at least their output side, and in many instances on their input side as well. While these regenerators overcome the problem of insertion loss and effectively allow wavelength conversion of the signal as it traverses the switch fabric, they substantially add to the cost of an already expensive switch fabric because a regenerator is required for each and every wavelength that is used in the network.

More flexible still are all-optical reconfigurable switches which have much lower insertion losses and are less expensive than the aforementioned OXC's. Various examples of all-optical reconfigurable optical switches are disclosed in U.S. patent application Ser. No. 09/571,833, which is hereby incorporated by reference in its entirety, and in particular FIGS. 2-4 of that reference. The switching elements disclosed therein can selectively direct any wavelength component from any input port to any output port, independent of the routing of the other wavelengths without the need for any electrical-to-optical conversion. Another all-optical reconfigurable optical switch that provides additional functionality is disclosed in U.S. patent application Ser. No. 09/691,812, which is hereby incorporated by reference in its entirety. This reference discloses an optical switching element in which each and every wavelength component can be directed from any given port to any other port without constraint. More specifically, unlike most optical switches, this switch is not limited to providing connections between a subset of input ports and a subset of output ports, or vice versa. Rather, this switch can also provide a connection between two ports within the same subset (either input or output). While the present invention may employ any of the aforementioned reconfigurable optical switches, the optical switch disclosed in U.S. patent application Ser. No. 09/691,812 will serve as an exemplary reconfigurable optical switch, and accordingly, additional details concerning this switch will be presented below.

Figure 1:
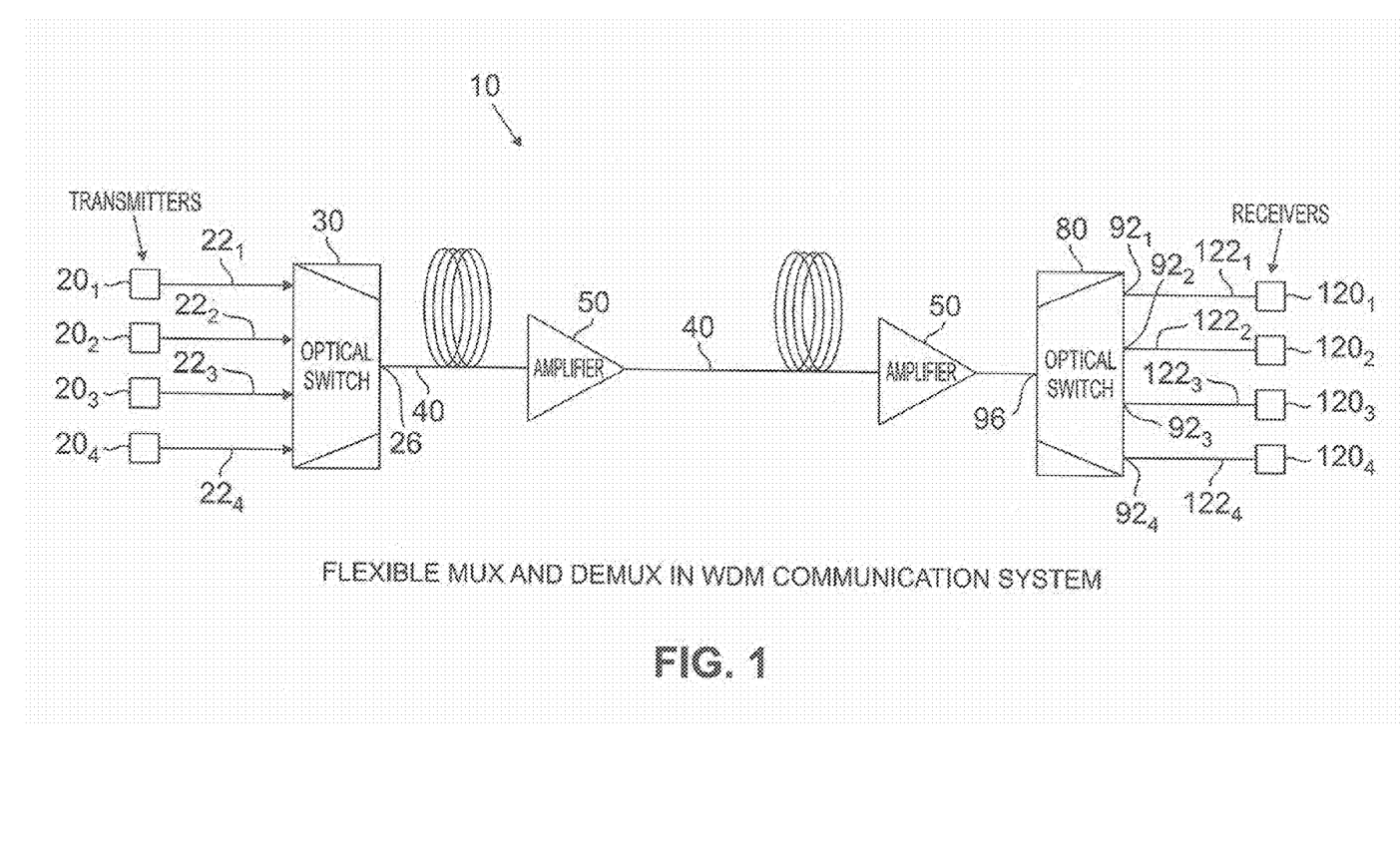
FIGS. 1 and 2 are schematic representations of a wavelength division multiplexed optical communication system in accordance with the present invention.

Turning now to the drawings in detail in which like numerals indicate the same or similar elements, FIG. 1 schematically depicts a wavelength division multiplexed (WDM) optical communication system 10 according to one embodiment of the present invention. Optical communication system 10 includes a plurality of optical transmitters 20, each optical transmitter emitting an information-bearing optical signal at an optical channel wavelength that differs from transmitter to transmitter. The expression "information-bearing optical signal," as used herein, refers to an optical signal which has been coded with information, including, but not limited to, audio signals, video signals, and computer data. The WDM optical communication systems of the present invention include N channels, where N is a whole number greater than or equal to 2. Exemplary values for N are 4, 8, and 16 optical channels. In the optical system of FIG. 1, N is depicted as 4 for ease of illustration.

It should be noted at the outset that the present invention is not limited to WDM systems such as shown in FIG. 1, which have a point-to-point configuration consisting of end terminals or nodes spaced from each other by one or more segments of optical fiber. For example, in metropolitan areas, WDM systems having a ring or loop configuration are currently being developed. Such systems typically include a plurality of nodes located along the ring. At least one optical add/drop element, associated with each node, is typically connected to the ring with optical connectors. The optical add/drop element permits both addition and extraction of channels to and from the ring. One of the nodes, referred to as a hub or central office node, typically has a plurality of associated add/drop elements for transmitting and receiving a corresponding plurality of channels to/from other nodes along the ring. Of course, the present invention is equally applicable to other network topologies in addition to rings such as a mesh topology.

Returning to FIG. 1, each optical transmitter 20 generally includes a laser, such as a DFB semiconductor laser, a laser controller, and a modulator for creation of an information-bearing optical signal. In an exemplary embodiment, the transmitter laser is a DFB semiconductor diode laser, generally comprising one or more III-V semiconductor materials, commercially available from a wide variety of suppliers. The laser outputs an optical carrier signal at a particular wavelength assigned to its channel. The laser controller provides the required laser bias current as well as thermal control of the laser. Using thermal control, the precise operating wavelength of the laser is maintained, typically to within a one-angstrom bandwidth or less.

The optical transmitter typically includes a modulator for imparting information to the optical carrier signal. An exemplary modulator is an external modulator, such as a Mach-Zehnder modulator, employing a waveguiding medium whose refractive index changes according to the applied electrical field, i.e., a material exhibiting an electro-optic effect. In the Mach-Zehnder configuration, two optical interferometer paths are provided. An incoming optical carrier signal is split between the two optical paths. At least one path of the interferometer is phase modulated. When the signal is recombined at the output, the light from the paths either constructively or destructively interferes, depending upon the electrical field applied to the surrounding electrodes during the travel time of the carrier. This recombination creates an amplitude-modulated output optical signal. The optical carrier signal can alternatively be directly modulated for some system applications. It is noted that while the above-described transmitters are exemplary, any transmitting elements capable of producing optical signals for use in an optical communication system can be employed in the WDM systems of the present invention.

Typically, the wavelengths emitted by optical transmitters 20 are selected to be within the 1500 nanometer range, the range in which the minimum signal attenuation occurs for silica-based fibers. More particularly, the wavelengths emitted by the optical transmitters are selected to be in the range from 1540 to 1560 nanometers. However, other wavelengths, such as those in the 1300-1500 nm range and the 1600 nm range, can also be employed in the WDM systems of the present invention.

Each information-bearing optical signal produced by an optical transmitter constitutes a channel in optical system 10. In a WDM system, each channel is generally associated with a unique wavelength. As depicted in FIG. 1, four optical transmitters $20_1$, $20_2$, $20_3$, and $20_4$ are provided to create a four-channel wavelength division multiplexed optical communication system. The optical transmitters $20_1$, $20_2$, $20_3$, and $20_4$ operate at channel wavelengths of $\lambda_1$, $\lambda_2$, $\lambda_3$, and $\lambda_4$, respectively. These optical signal channels are output from transmitters 20 and are brought brought together in optical switch 30 for conveyance to optical waveguide 40 via output port 26.

Optical switch 30 combines plural optical channels from transmitters 20 onto a single output to create a multiplexed optical signal. Optical switch 30 has four input ports that are optically coupled to the four transmitters 20 through optical waveguides 22. The combination of channels forms a multiplexed optical signal which is output to optical transmission path 40 through output port 26. Optical transmission path 40 is typically an optical waveguide and is the principal transmission medium for the optical communication system. While the optical waveguide is generally selected from single-mode optical, any optical waveguiding medium which is capable of transporting multiple optical wavelengths can be employed as waveguide 40 in optical system 10.

Optionally, one or more optical amplifiers 50 are interposed along optical transmission path 40. Optical amplifiers 50 are selected from any device which directly increases the strength of plural optical signals without the need for optical-to-electrical conversion. In general, optical amplifiers 50 are selected from optical waveguides doped with a material which can produce laser action in the waveguide. Such materials include rare earth dopants such as erbium, neodymium, praseodymium, ytterbium, or mixtures thereof. Pumping of the doped waveguide at a specific pump wavelength causes population inversion among the electron energy levels of the dopant, producing optical amplification of the wavelength division multiplexed optical signals. For doped fiber amplifiers employing erbium as the dopant, a wavelength band between approximately 1500 nm and approximately 1590 nm provides gain to optical signals when the doped fiber is pumped.

Following transmission and amplification of the multiplexed optical signals along waveguide 40, each channel must be demultiplexed and routed to the receiver designated for the particular optical signal channel. The multiplexed signal is input to optical switch 80. In a preferred embodiment of the invention, optical switch 80 is also a reconfigurable optical switch. Optical switch 80 receives the multiplexed optical signal through input port 96 and provides the individual channels on output ports 92. Output ports 92 are each coupled to receivers 120 over optical waveguides 122. Receivers 120 generally detect the optical signal and converts it to an electrical signal, typically through the use of a photodiode device.

As previously mentioned, in a conventional WDM optical communication system optical switches 30 and 80 are generally based on multiplexers and demultiplexers that are fixed wavelength-dependent elements in which a given wavelength is always routed along the same path. However, in the present invention, instead of fixed-wavelength dependent elements, more flexible optical switches are employed. Such optical switches are reconfigurable elements that can dynamically change the path along which a given wavelength is routed. As discussed below, the use of reconfigurable optical switches that allow the path along which a given wavelength is routed to be dynamically changed, effectively reconstructing the topology of the network, is particularly advantageous in the event of a failure in one or more transmitters or receivers.

Figure 3:
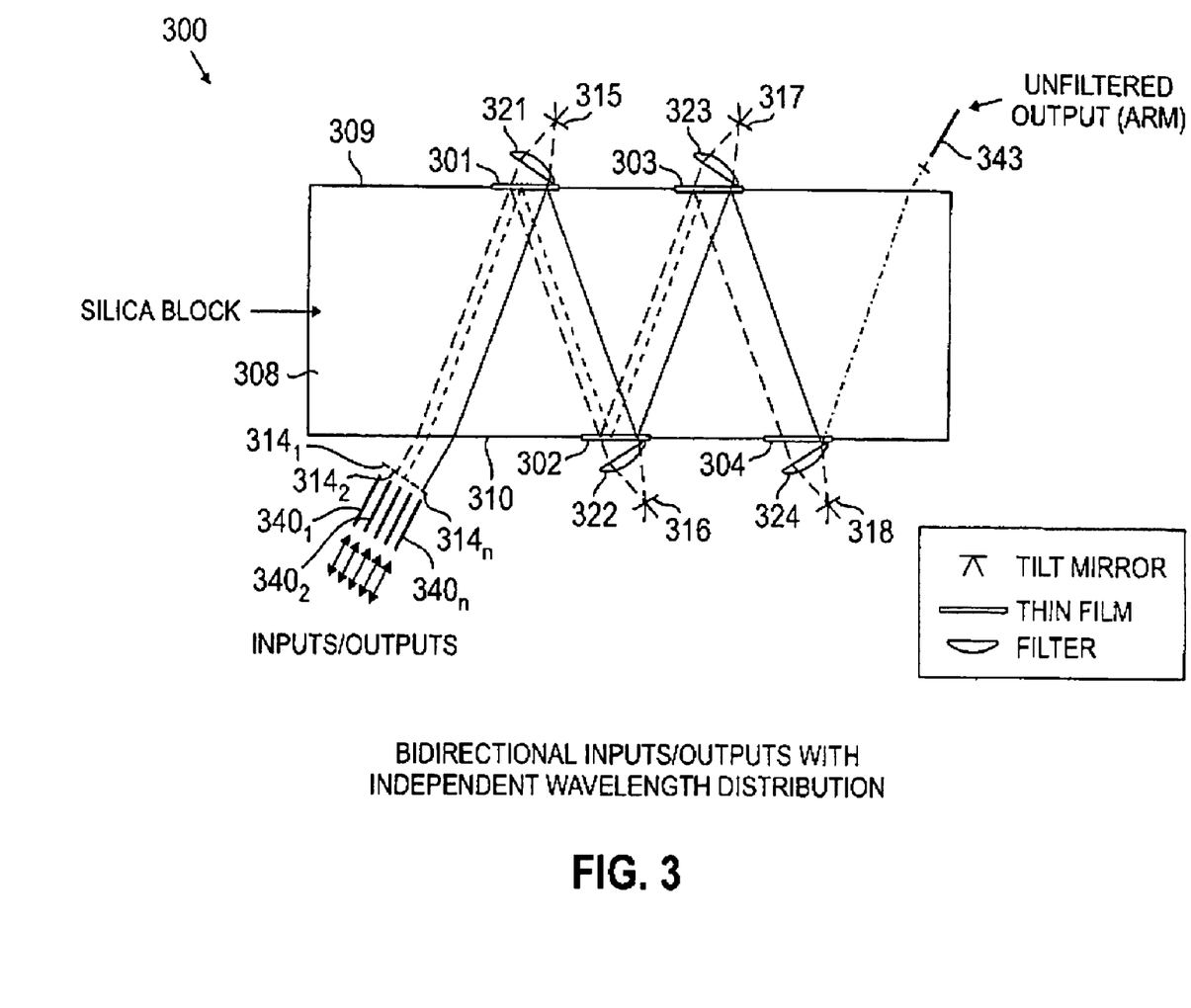
FIG. 3 shows an exemplary reconfigurable optical switch that may be employed in the present invention.

As previously mentioned, for purposes of illustration only the present invention will be depicted in connection with the reconfigurable optical switch disclosed in the aforementioned U.S. application Ser. No. 09/571,833, which is shown in FIG. 3. Of course, those of ordinary skill in the art will recognize that the invention is equally applicable to a communication system that employs any reconfigurable optical switch in which any wavelength component received on any input port can be selectively directed to any output port, independent of the routing of the other wavelengths. In FIG. 5, the optical switch 300 comprises an optically transparent substrate 308, a plurality of dielectric thin film filters 301, 302, 303, and 304, a plurality of collimating lens pairs 321, 322, 323, and 324, a plurality of tiltable mirrors 315, 316, 317, and 318 and a plurality of output ports $340_1$, $340_2$, ... $340_n$. A first filter array is composed of thin film filters 301 and 303 and a second filter array is composed of thin film filters 302 and 304. Individual ones of the collimating lens pairs 321-324 and tiltable mirrors 315-318 are associated with each of the thin film filters. Each thin film filter, along with its associated collimating lens pair and tiltable mirror effectively forms a narrow band, free space switch, i.e. a switch that routes individual wavelength components along different paths. The tiltable mirrors are micro mirrors such as the MEMS (microelectromechanical systems) mirrors. Alternatively, other mechanisms may be employed to control the position of the mirrors, such as piezoelectric actuators, for example.

In operation, a WDM optical signal composed of different wavelengths $\lambda_1$, $\lambda_2$, $\lambda_3$ and $\lambda_4$ is directed from the optical input port 340 to a collimator lens 314. The WDM signal traverses substrate 308 and is received by thin film filter 301. According to the characteristics of the thin film filter 301, the optical component with wavelength $\lambda_1$ is transmitted through the thin film filter 301, while the other wavelength components are reflected and directed to thin film filter 302 via substrate 308. The wavelength component $\lambda_1$, which is transmitted through the thin film filter 301, is converged by the collimating lens 321 onto the tiltable mirror 315. Tiltable mirror 315 is positioned so that wavelength component $\lambda_1$ is reflected from the mirror to a selected one of the output ports $340_1$-$340_n$ via thin film filters 302-304, which all reflect wavelength component $\lambda_1$. The particular output port that is selected to receive the wavelength component will determine the particular orientation of the mirror 315.

As mentioned, the remaining wavelength components $\lambda_2$, $\lambda_3$, and $\lambda_4$ are reflected by thin film filter 301 through lens 321 back into substrate 308 and directed to thin film filter 302. Wavelength component $\lambda_2$ is transmitted through thin film filter 302 and lens 322 and directed to a selected output port by tiltable mirror 316 via thin film filters 303-304, which all reflect wavelength component $\lambda_2$. Similarly, all other wavelength components are separated in sequence by the thin film filters 303-304 and subsequently directed by tiltable mirrors 317-318 to selected output ports. By appropriate actuation of the tiltable mirrors, each wavelength component can be directed to an output port that is selected independently of all other wavelength components.

Returning to FIG. 1, as previously noted, optical transmitters $20_1$, $20_2$, $20_3$, and $20_4$ operate at channel wavelengths of $\lambda_1$, $\lambda_2$, $\lambda_3$, and $\lambda_4$, respectively. To additional transmitter is sometimes reserved as a spare transmitter that can serve as a backup until the failed transmitter can be repaired or replaced. In a conventional communication system employing fixed-wavelength dependent switching elements, the backup transmitter operates at a different channel wavelength from the failed transmitter, requiring that an end-to-end backup path be established through the system. For example, if a backup transmitter were to be employed in the network shown in FIG. 1, it could operate at a channel wavelength of $\lambda_5$. Consequently, the original data path must be reconfigured for a backup path operating at a different channel wavelength. As previously mentioned, one problem with this approach is that path reconfiguration can be a slow process because it often requires inter-node communication and processing. Moreover, in some cases path reconfiguration may disturb other traffic in the system.

The present inventors have recognized that rather than reconfigure the path for a backup channel in the event of a transmitter failure, it will often be preferable to maintain the original path while only reconfiguring equipment at the switch associated with the failed transmitter. While such a reconfiguration procedure is not possible with fixed-wavelength dependent optical switches, it can be readily accomplished with any of the aforementioned reconfigurable optical switches that allow any wavelength to be selectively routed between any two ports.

Figure 2:
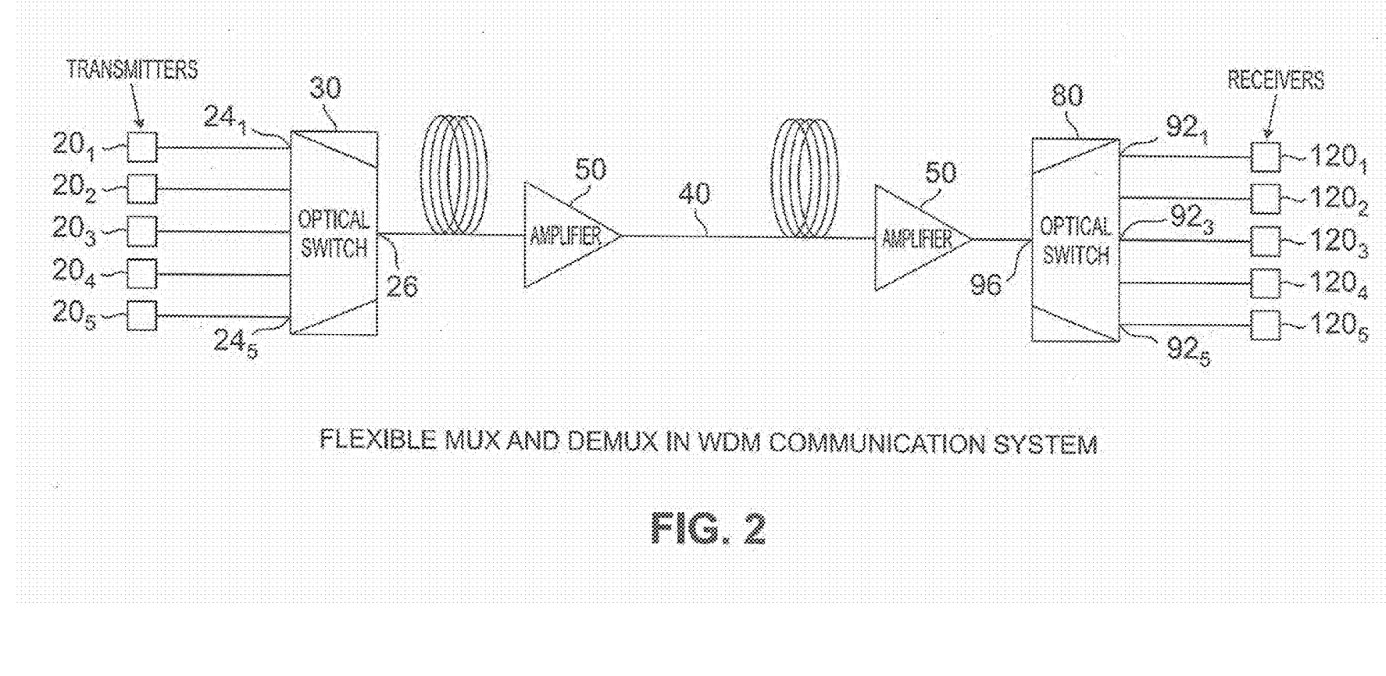

FIG. 2 shows a WDM system that includes a backup transmitter $20_5$ having a tunable laser that can be tuned to any of the channel wavelengths at which transmitters $20_1$-$20_4$ operate. In this way backup transmitter $20_5$ can be readily substituted for any of the primary transmitters. Since optical switch 30 can receive any wavelength at any input port, optical switch 30 can be reconfigured so that any of the wavelengths $\lambda_1$-$\lambda_4$ can be received at the input port $24_5$ to which backup transmitter $20_5$ is coupled. For example, assume transmitter 202 fails. In response to the failure, backup transmitter $20_5$ is tuned to channel wavelength $\lambda_2$. In turn, optical switch 30 is internally reconfigured so that it can accept wavelength $\lambda_2$ from input port $24_5$ and direct it to output port 26. In this way the transmitter failure is transparent to the remainder of the network so that no reconfiguration of the path through the network is required. While FIG. 2 shows only a single backup transmitter, those of ordinary skill in the art will recognize that additional backup transmitters may be employed in the relatively unlikely event that two or more transmitters fail at the same time.

In the event of a failure in one of the receivers 120, the same reconfiguration problems arise as with a failed transmitter. Accordingly, the present invention may also be advantageously used to redirect a channel wavelength from the failed receiver to a backup receiver if the receivers are in communication with a reconfigurable optical switch. That is, assuming, for example, that receiver $120_3$ fails, switch 80 can be internally reconfigured so that channel wavelength $\lambda_3$ is redirected from output port $92_3$ to the port $92_5$, which is coupled to the backup receiver $120_5$. Unlike the backup transmitter, however, a tunable receiver will generally not be necessary because the receivers can typically detect all the channel wavelengths that are available to the network.

The invention claimed is:

1. In a WDM optical communication system that includes a plurality of nodes interconnected by communication links, a node comprising:

a reconfigurable optical switch having a plurality of input ports and at least one output port;

a plurality of transmitters each coupled to one of the input ports of the optical switch, each of said transmitters generating an information-bearing optical signal at a different channel wavelength from one another, said reconfigurable optical switch being adaptable to receive at any of the input ports any of the channel wavelengths at which the plurality of transmitters operate and direct said channel wavelengths to said at least one output port;

at least one backup transmitter coupled to one of the input ports of the optical switch, said backup transmitter including a tunable laser tunable to any of the channel wavelengths at which the plurality of transmitters operate;

wherein said reconfigurable optical switch includes;

at least one wavelength selective element that selects at least one channel wavelength from among any of the channel wavelengths received at any of the input ports, wherein said at least one wavelength selective element comprises a plurality thin film filters each transmitting therethrounh a different one of the channel wavelengths and reflecting the remaining channel wavelengths; and a plurality of optical elements associated with said at least one wavelength selective element, each of said optical elements directing one of the selected channel wavelengths selected by the associated at least one wavelength selective element to said output port independently front every other channel wavelength, wherein said selected channel wavelengths directed to said output port are combined on said output port, wherein said optical elements are reflective mirrors that are selectively tiltable in a plurality of positions such that in each of the positions the mirrors reflect the channel wavelength incident thereon to the output port.

2. The node of claim 1 wherein said reflective mirrors are part of a micro-electromechanical (MEM) mirror assembly.

3. The node of claim 1 further comprising a free space region disposed between the input ports and the wavelength selective elements.

4. The node of claim 1 further comprising:

a second reconfigurable optical switch having a plurality of output ports and at least one input port;

a plurality of receivers each coupled to one of the output ports of the optical switch, each of said receivers receiving an information-hearing optical signal at a different channel wavelength from one another, said second reconfigurable optical switch being adaptable to receive at any of the output ports any of the channel wavelengths at which the plurality of transmitters operate and direct said channel wavelengths to said output port; and at least one backup receiver coupled to one of the output ports of the second optical switch.

5. In a WDM optical communication system that includes a plurality of nodes interconnected by communication links, a node comprising:

a reconfigurable optical switch having a plurality of input ports and at least one output port;

a plurality of transmitters each coupled to one of the input ports of the optical switch, each of said transmitters generating an information-bearing optical signal at a different channel wavelength from one another, said reconfigurable optical switch being adaptable to receive at any of the input ports any of the channel wavelengths at which the plurality of transmitters operate and direct said channel wavelengths to said al least one output port;

at least one backup transmitter coupled to one of the input ports of the optical switch, said backup transmitter including a tunable laser tunable to any of the channel wavelengths at which the plurality of transmitters operate;

wherein said reconfigurable optical switch includes;

at least one wavelength selective element that selects at least one channel wavelength from among any of the channel wavelengths received at any of the input ports, wherein said at least one wavelength selective element comprises a plurality thin film filters each transmitting therethrough a different one of the channel wavelengths and reflecting the remaining channel wavelengths; and a plurality of optical elements associated with said at least one wavelength selective element, each of said optical elements directing one of the selected channel wavelengths selected by the associated at least one wavelength selective element to said output port independently from every other channel wavelength, wherein said selected channel wavelengths directed to said output port are combined on said output port, and further comprising a free space region disposed between the input ports and the wavelength selective elements wherein said free space region comprises an optically transparent substrate having first and second parallel surfaces, said wavelength selective clement includes a plurality of wavelength selective elements arranged in first and second arrays extending along the first and second parallel surfaces, respectively.

6. The node of claim 5 wherein said first and second arrays are laterally offset with respect to one another.

7. The node of claim 6 wherein each of said wavelength selective elements arranged in the first array direct the selected wavelength component to another of said wavelength selective elements arranged in the second array.

8. In a WDM optical communication system that includes a plurality of nodes interconnected by communication links, a node comprising:

a reconfigurable optical switch having (i) N input ports for receiving a WDM optical signal having up to (N−1) channel wavelengths (ii) at least one output port, where N is greater than or equal to 2 and (iii) a switching fabric that includes at least (N−1) optical elements each directing a selected one of the channel wavelengths between the input ports and the at least one output port;

N transmitters respectively coupled to the N input ports of the optical switch, said transmitters each including a tunable laser tunable to any at the (N−1) channel wavelengths, said reconfigurable optical switch being adaptable to receive at any of the input ports any of the channel wavelengths at which the plurality of transmitters operate and direct each of the channel wavelengths to said at least one output port by reconfiguration of the optical clement respectively directing the channel wavelength; and at least (N−1) wavelength selective elements that each select at least one channel wavelength from among any of the channel wavelengths received at any of the input ports and wherein the (N−1) optical elements are respectively associated with said (N−1) wavelength selective elements, each of said optical elements directing one of the selected channel wavelengths selected by the associated at least one wavelength selective element to said output port independently from every other channel wavelength, wherein said selected channel wavelengths directed to said output port are combined on said output port, wherein said optical elements are reflective mirrors that arc selectively tiltable in a plurality of positions such that in each of the positions the mirrors reflect the channel wavelength incident thereon to the output port.

9. The node of claim 8 wherein said wavelength selective elements each comprise a plurality of thin film filters each transmitting therethrough a different one of the channel wavelengths and reflecting the remaining channel wavelengths.

10. The node of claim 8 wherein said reflective mirrors are pan of a micro-electromechanical (MEM) mirror assembly.

11. The node of claim 8 wherein at least one of said wavelength selective elements comprises a bulk diffraction grating.

12. The node of claim 8 further comprising a free space region disposed between the input ports and the wavelength selective elements.

13. The node of claim 8 further comprising a second reconfigurable optical switch having (i) N output ports for transmitting a WDM optical signal having up to (N−1) channel wavelengths (ii) at least one input port, where N is greater than or equal to 2 and (iii) a switching fabric that includes at least (N−1) optical elements each directing a selected one of the channel wavelengths between the input port and an one output port, N receivers respectively coupled to the N output ports of the second optical switch, said second reconfigurable optical switch being adaptable to receive at any of the output ports any of the channel wavelengths at which the plurality of transmitters operate and direct each of the channel wavelengths to said output port by reconfiguration of the optical element respectively directing the channel wavelength.

14. In a WDM optical communication system that includes a plurality of nodes interconnected by communication links, a node comprising:

a reconfigurable optical switch having (i) N input ports for receiving a WDM optical signal having tip to (N−1) channel wavelengths (ii) at least one output port, where N is greater than or equal to 2 and (iii) a switching fabric that includes at least (N−1) optical elements each directing a selected one of the channel wavelengths between the input ports and the at least one output port;

N transmitters respectively coupled to the N input ports of the optical switch, said transmitters each including a tunable laser tunable to any of the (N−1) channel wavelengths, said reconfigurable optical switch being adaptable to receive at any of the input ports any of the channel wavelengths at which the plurality transmitters operate and direct each of the channel wavelengths to said at least one output non by reconfiguration of the optical element respectively directing the channel wavelength;

at least (N−1) wavelength selective elements that each select at least one channel wavelength from among any of the channel wavelengths received at any of the input ports and wherein the (N−1) optical elements are respectively associated with said (N−1) wavelength selective elements, each of said optical elements directing one of the selected channel wavelengths selected by the associated at least one wavelength selective element to said output port independently from every other channel wavelength, wherein said selected channel wavelengths directed to said output port are combined on said output port; and a free space region disposed between the input ports and the wavelength selective elements, wherein said free space region comprises an optically transparent substrate having first and second parallel surfaces, said wavelength selective element includes a plurality of wavelength selective elements arranged in first and second arrays extending along the first and second parallel surfaces, respectively.

15. The node of claim 14 wherein said first and second arrays are laterally offset with respect to one another.

16. The node of claim 15 wherein each of said wavelength selective elements arranged in the first array direct the selected wavelength component to another of said wavelength selective elements arranged in the second army.

* * * * *

UNITED STATES PATENT AND TRADEMARK OFFICE
CERTIFICATE OF CORRECTION

| | | |
|---|---|---|
| PATENT NO. | : 7,599,619 B2 | Page 1 of 1 |
| APPLICATION NO. | : 10/099561 | |
| DATED | : October 6, 2009 | |
| INVENTOR(S) | : Thomas Andrew Strasser et al. | |

It is certified that error appears in the above-identified patent and that said Letters Patent is hereby corrected as shown below:

Title Page Item 57 Abstract, line 21, after "selective elements", change "," to -- . --.

Specification, Col. 2, line 49, after "selective elements", change "," to -- . --.

Specification, Col. 5, line 60, after "transmitters", change "$2O_1$" to -- $20_1$ --.

Specification, Col. 5, line 63, after "brought" (1st occurrence), delete "brought".

Specification, Col. 7, line 47, after "To", insert -- ensure system reliability in the event that one of the transmitters should fail, an --.

Claim 4, Col. 9, line 27, after "information-", change "hearing" to -- bearing --.

Claim 14, Col. 12, line 3, after "output", change "non" to -- port --.

Signed and Sealed this

Twenty-sixth Day of January, 2010

David J. Kappos
*Director of the United States Patent and Trademark Office*